United States Patent [19]  
McElroy

[11] 4,085,505  
[45] Apr. 25, 1978

[54] POLYETHYLENE INTERNAL BEAD REMOVER

[76] Inventor: Arthur H. McElroy, 5619 E. Independence, Tulsa, Okla. 74115

[21] Appl. No.: 741,558

[22] Filed: Nov. 15, 1976

[51] Int. Cl.$^2$ ............................................. B26B 3/00
[52] U.S. Cl. ...................................... 30/278; 30/103
[58] Field of Search ................. 30/103, 104, 108, 105, 30/278

[56] References Cited

U.S. PATENT DOCUMENTS

| | | | |
|---|---|---|---|
| 303,524 | 8/1884 | Lee | 30/108 |
| 622,681 | 4/1899 | Hervey | 30/104 |
| 742,915 | 11/1903 | Sherman | 30/108 |
| 887,604 | 5/1908 | Dorn | 30/108 |
| 1,100,760 | 6/1914 | Morelli | 30/105 |
| 1,108,171 | 8/1914 | Henrikson | 30/105 |
| 1,160,019 | 11/1915 | Wagner | 30/108 |
| 2,572,611 | 10/1951 | Glore et al. | 30/104 |
| 2,915,819 | 12/1959 | O'Day et al. | 30/103 |
| 3,196,722 | 7/1965 | Lewis et al. | 30/104 UX |
| 3,243,879 | 4/1966 | Gill et al. | 30/103 |

FOREIGN PATENT DOCUMENTS

| | | | |
|---|---|---|---|
| 430,897 | 8/1911 | France | 30/104 |
| 23,584 | 4/1912 | Norway | 30/104 |
| 2,583 of | 1868 | United Kingdom | 30/103 |

Primary Examiner—James L. Jones, Jr.  
Assistant Examiner—J. T. Zatarga  
Attorney, Agent, or Firm—Head, Johnson & Chafin

[57] ABSTRACT

Apparatus for removing the internal bead from a polyethylene pipe joint, that has been fabricated by the fusion process, comprising a torque tube of sufficient length to reach from the open end of the pipe to the joint from which the internal bead is to be removed. At the distal end of the torque tube is a cutter head, which includes a blade set at the proper angle to contact the inner surface of the pipe. This blade is mounted on an arm which has a hub to which the torque tube can be attached. A support frame has two legs and is pivoted to the cutter arm in such a way that when the torque tube and cutter arm are turned counterclockwise, the blade is pulled away from contact with the internal surface of the pipe. When the torque tube and arm are turned clockwise, the arm rotates about its pivot on the support frame and comes into a position such that the blade is opposite the support legs, and locks against a stop pin. The cutter blade in that position is pressed against the inner surface of the pipe. At the proximal end of the torque tube which extends outside of the open end of the pipe, a handle is provided for rotating the torque tube. The handle is attached to an outer tube, which is adapted to slide along and be locked to the torque tube. The outer tube which supports the handle also supports a plate which carries three angularly spaced arms of adjustable radius. These arms centralize the torque tube at the handle end.

9 Claims, 13 Drawing Figures

U.S. Patent  April 25, 1978  Sheet 1 of 4  4,085,505
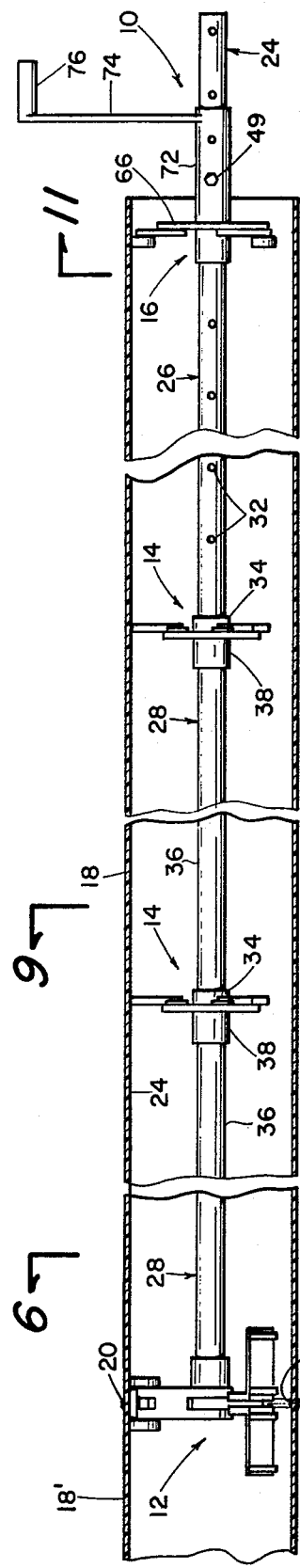
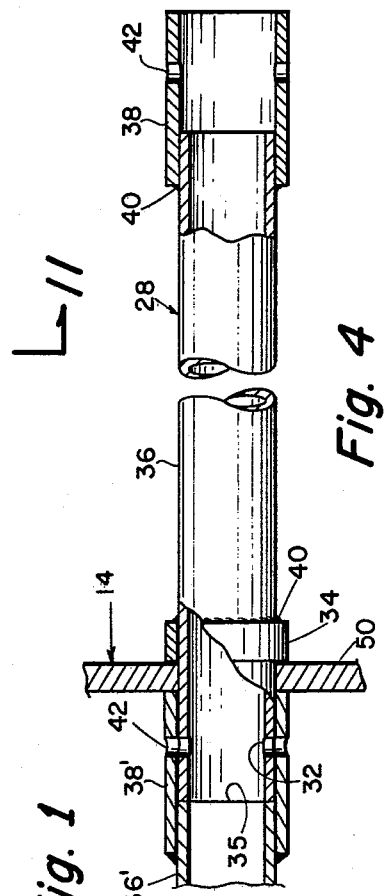
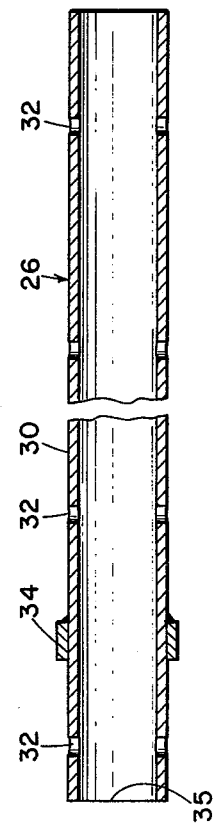
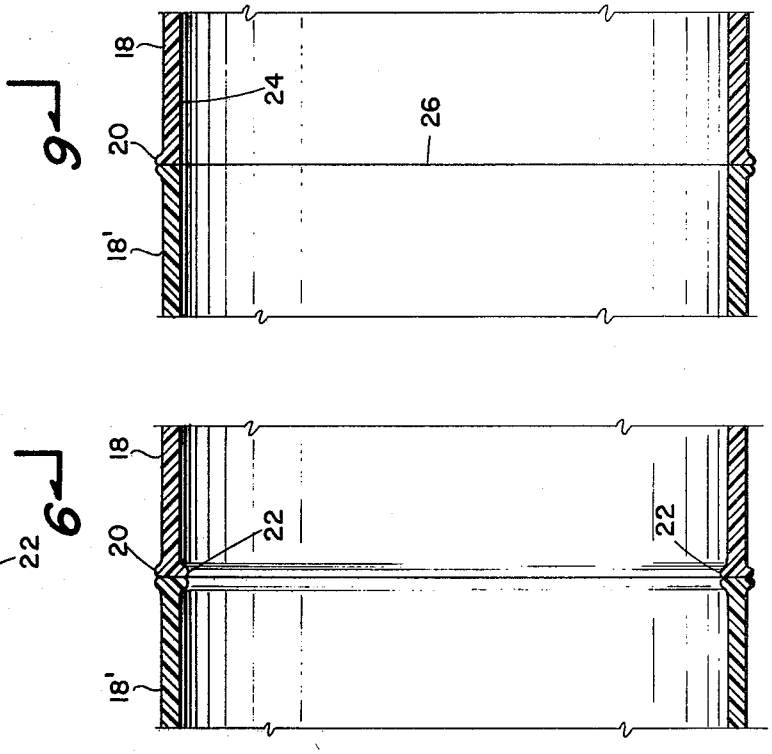

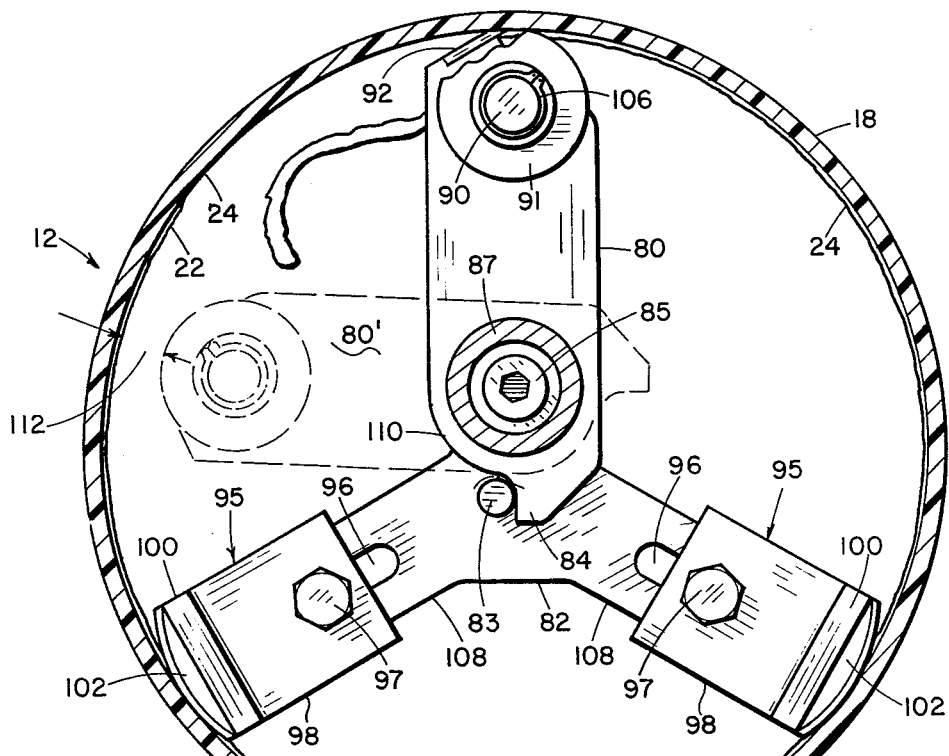
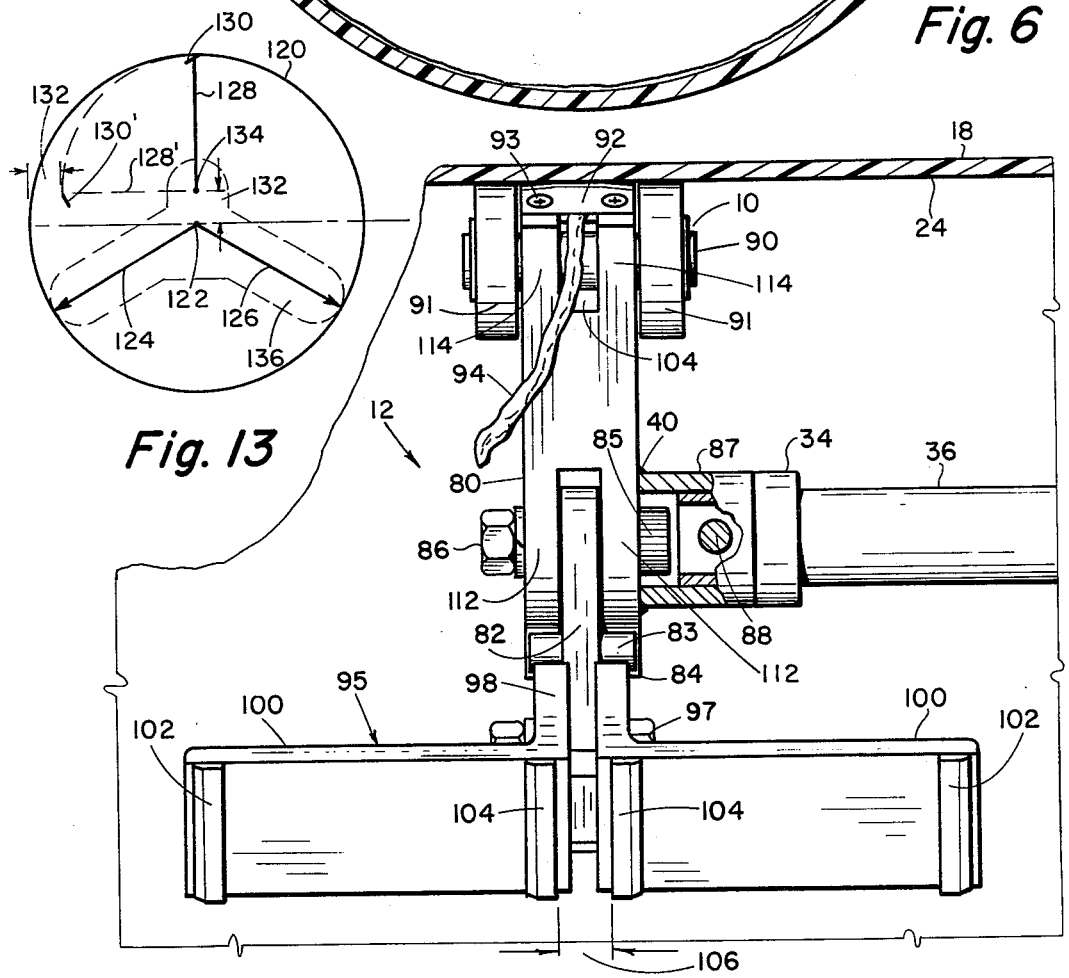

4,085,505

POLYETHYLENE INTERNAL BEAD REMOVER

BACKGROUND OF THE INVENTION

1. Field of the Invention

This invention lies in the field of polyethylene pipe construction. More particularly, this invention lies in the area of the joining of large diameter pipes by means of heat fusion butt apparatus. Still more particularly, it involves apparatus utilized for the purpose of removing, or cutting away, the internal beads that form when two lengths of polyethylene pipe are joined by fusion.

2. Description of the Prior Art

In the joining of polyethylene pipe by the fusion method, there is naturally a tendency for heat softened material, at the mating surfaces, to be squeezed radially inwardly and outwardly to form beads. The internal beads are troublesome because they may extend inwardly a distance of 1/16 or ⅛ of an inch and, therefore, reduce the diameter at each joint. They thus cause a resistance to flow of fluid through the pipe. In particular, in the newest developments in transporting large objects such as oranges, or other fruit or vegetables, or mechanical objects, or minerals, it is important, for reasons of power requirements, to provide as smooth an interior surface as possible. It is, therefore, important to remove the internal bead, prior to completing the construction of a line using segments of polyethylene pipe.

In the prior art, there is no satisfactory method, at present, for machining or cutting away the internal beads which form when the sections of pipe are joined by fusion.

SUMMARY OF THE INVENTION

It is a primary object of this invention to provide an apparatus for insertion into the interior of a polyethylene pipeline, and to cut away and remove the internal bead that is formed by the fusion joining of the pipe sections.

These and other objects are realized and the limitations of the prior art are overcome in this invention by providing an apparatus which comprises a long jointed pipe or tube, which will be called a torque tube. At one end of this torque tube is a cutter head which is inserted first into the line and positioned adjacent the joint from which the bead is to be removed. At the second end of the torque tube, which extends out of the open end of the last section of pipe attached is a handle by means of which the torque tube can be rotated. As a result, by positioning the cutter head in the plane of the joint, the handle can be rotated and the cutter head will remove the bead.

Since the length of the last pipe segment may be up to 40 feet or longer, or as short as a few feet, it is important to provide a torque tube that can be varied in length by joining a plurality of segments, so as to adjust to the different depths of insertion of the cutter head from the open end of the pipe. Also, as to the number of segments of the torque tube are combined, it is desirable to provide spaced support members inside of the pipe.

BRIEF DESCRIPTION OF THE DRAWINGS

These and other objects and advantages of this invention and a better understanding of the principles and details of the invention will be evident from the following description taken in conjunction with the appended drawings in which:

FIG. 1 illustrates in partial section, one embodiment of this invention.

FIGS. 2 and 3 show a typical joint in polyethylene pipe with external and internal beads in FIG. 2, and with the internal bead removed in FIG. 3.

FIGS. 4 and 5 show details of the segments of the torque tube.

FIGS. 6 and 7 illustrate in two views details of the cutter head assembly.

FIG. 13 illustrates the eccentric position of the cutter bar.

DESCRIPTION OF THE PREFERRED EMBODIMENT

Figure 9:
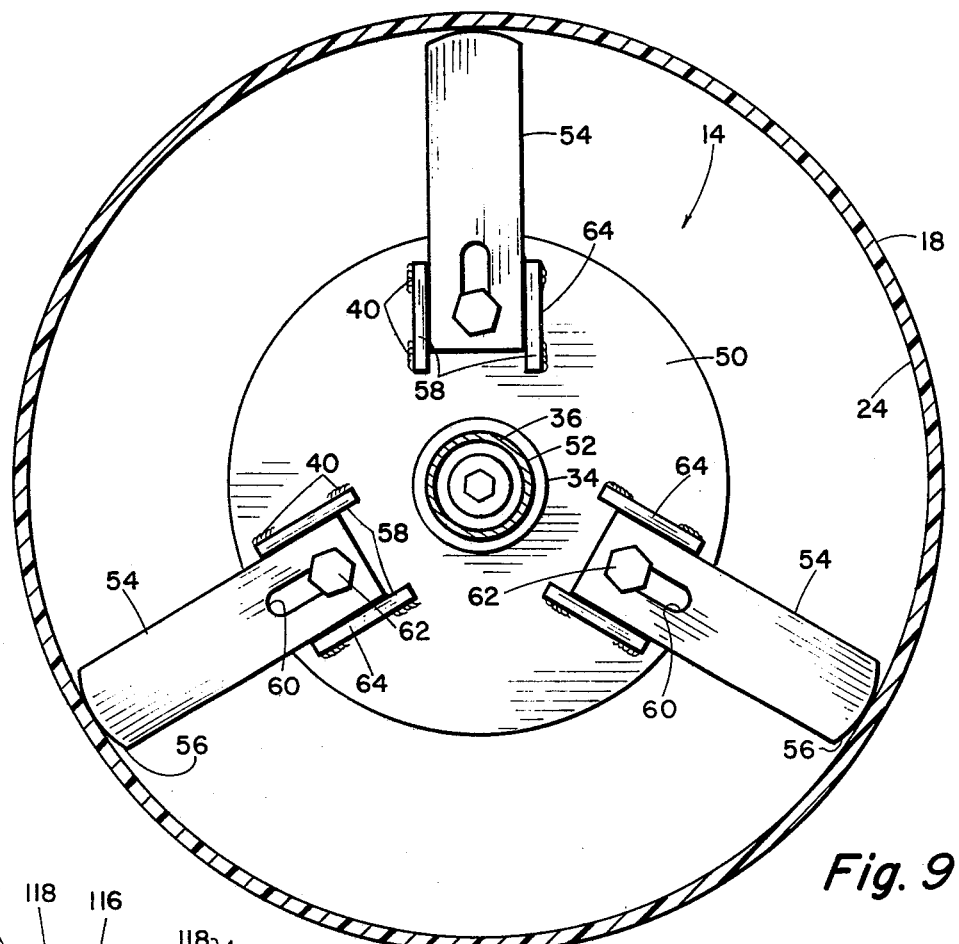
FIGS. 9 and 10 illustrate two views of the internal support plate.

Referring to the drawings and in particular in FIG. 1 there is indicated by the numeral 10 an overall view of the bead cutting apparatus of this invention. Numeral 12 indicates generally the cutting head which is attached at the distal end, to a torque tube having segments indicated generally by the numerals 28 and 26. There are intermediate support members indicated generally by the numeral 14, and a handle mechanism 16 which includes an operating arm and handle 76 and a roller equipped support plate 66 for rotatably supporting the torque tube at the position of the handle. Each of the parts of the assembly of FIG. 1 will be described in detail in conjunction with the remaining figures.

Figure 10:
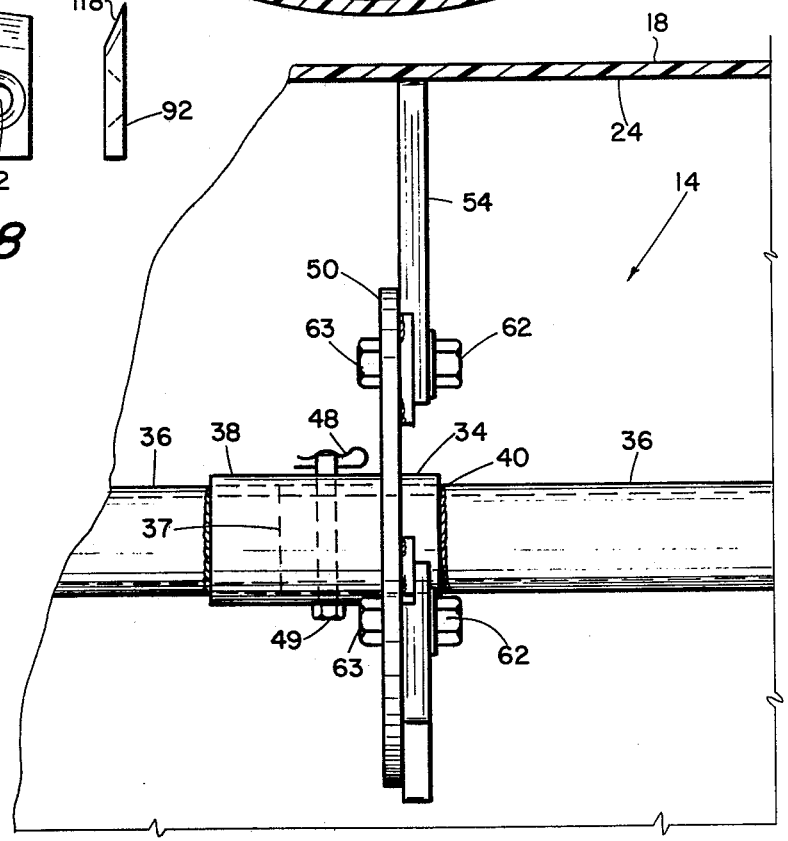

With reference to FIGS. 4 and 5, there are shown two types of segments or portions of the torque tube. FIG. 4 shows a segment indicated in general by the numeral 28. This comprises a piece of tubing or pipe 36 of a selected length. At one end closest to the handle end of the torque tube, is a collar 38 which overhangs and is attached to the tube 36 by means of welds 40. At a selected distance from the other, or distant end of the segment is a short collar 34, which is likewise attached as by welding 40, to the tube 36. The spacing between the collar and the end 35 is relatively precise. There are diametrial openings 32 in the tube, and 42 in the collars 38, 38', so that when the tube 36 is inserted into the collar 38', the openings 32 and 42 can be aligned, and as will be described, in FIG. 10, a bolt 49 can be inserted through the opening. The bolt can be locked in position by any desired means such as a cotter pin 48, for example, so that the segment 36' with its collar 38', can be locked, to the pipe segment 36, with its collar 38, which likewise can be locked to another segment, such as 26 of FIG. 1.

When collar 38' is locked to segment 36 by means of pin or bolt through openings 32 and 42, there will be sufficient space between the end of the collar 38' and the collar 34, so that a central plate of a support member 14 can be slipped over the end 35 of the pipe 36 and the pipe 36 can be rotated inside of the support member 14. In FIG. 1, two such segments 28 are illustrated, with two support members 14 which will be described in connection with FIGS. 9 and 10.

In FIG. 5, is shown a detail of the torque tube element 26 which is the outermost element of the assembly of the torque tube. This attaches at its distant end 35 to a collar 38 of a torque tube element 28 by means of a pin through the corresponding openings 32 and 42.

Throughout the remaining portion of the tube 26, are a plurality of spaced openings 32 diametrically drilled through the tube 26.

Figure 11:
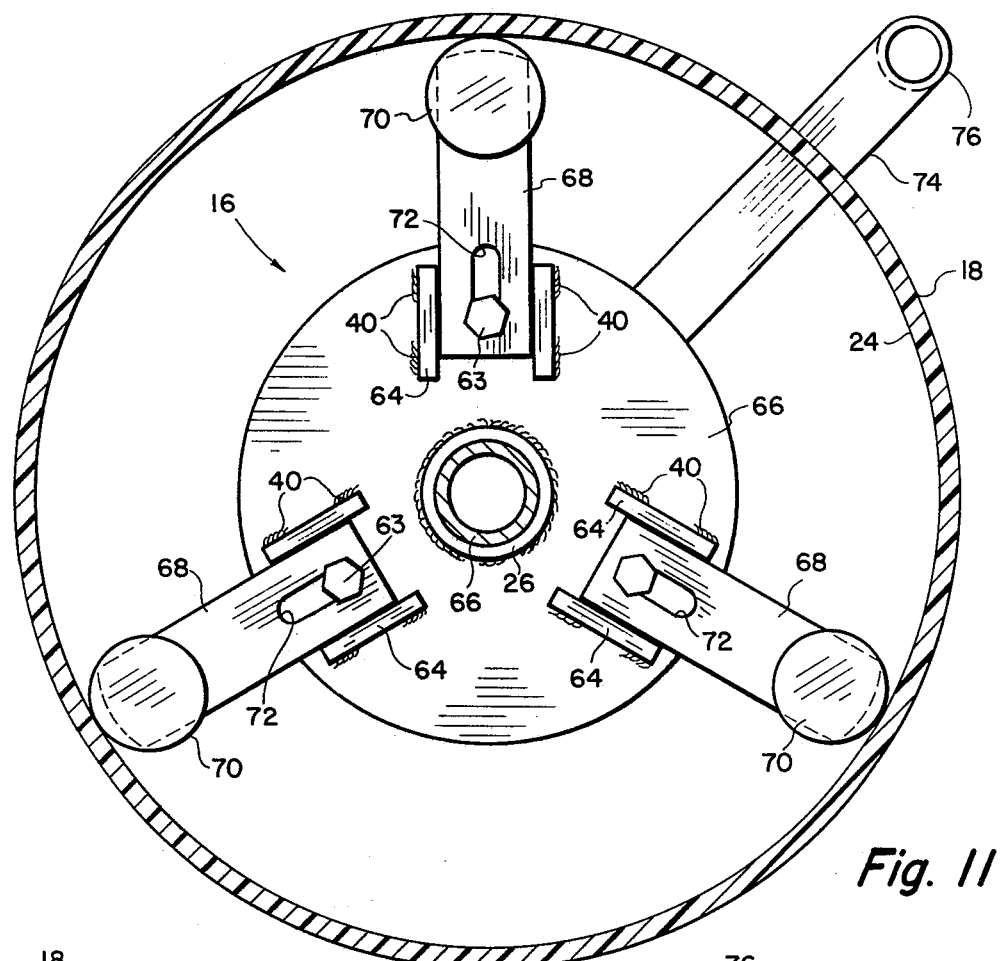
FIGS. 11 and 12 illustrate in two views details of the handle, and of a centering plate for positioning close to the handle.
Figure 12:
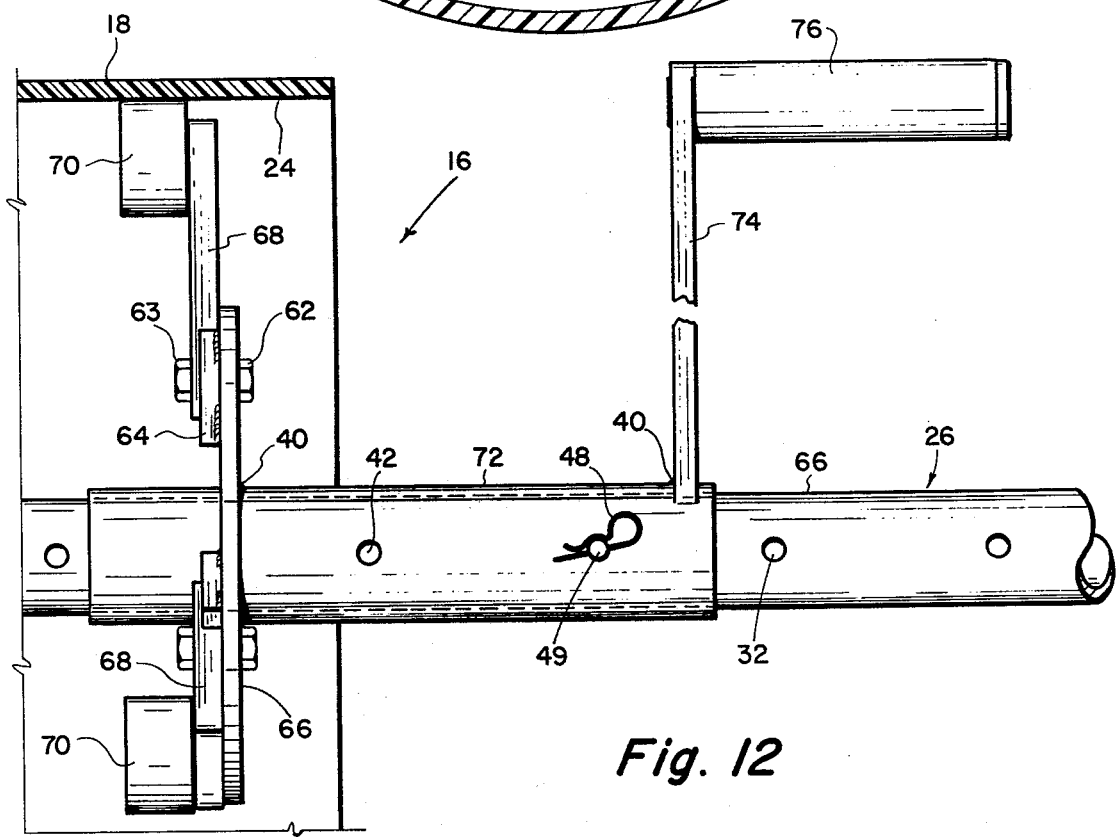

Referring now to FIGS. 11 and 12, there is shown a handle assembly which is slipped over, and locked to, the torque tube at the proximal end of the torque tube which projects out of the pipe. This assembly comprises a length of pipe or tubular means 72 which slides freely over the torque tube 26, and which can be locked by means of openings 42 in the pipe 72, which can be aligned with diametrial openings 32 in the pipe 66. A radial arm 74 is welded to the pipe 72. At the outermost end of the arm 74 is a handle 76 by means of which the arm 74 and pipe 74 can be rotated, and with it by means of bolt 49, passing through the openings 32 and 42, can be rotated the pipe 66 which is the end portion of the torque tube. With pipe 66 or torque tube element 26, one or more elements 28 can likewise be rotated, as can the cutterhead 12.

In other to maintain the torque tube in a longitudinal position inside the pipe 18, guide plate 66 is provided, which has a suitable opening so that it can be slipped over the pipe 72 and welded in a transverse position by means of welds 40 for example. On the plates 66 are three pairs of guides 64 which are welded 40 to the plate 66. There are three arms 68 which are adapted to slide between the guides 64 and be adjusted radially by means of slots 72 and to be locked to the plate 66 at a particular radial position, by means such as bolts 63.

At the outer end of the arms 68, are mounted rollers of any selected type, such as ball bearings, for example, which are adapted to roll along the internal surface 24 of the pipe 18, as the handle and the torque tube are rotated.

Referring now to FIGS. 6 and 7, there are shown two views of a cutterhead which is attached to the distal end of the torque tube and which can be rotated by rotating the torque tube by means of the handle 74, 76. The cutter arm 80 comprises a bar which has two ears 112 and 114 at each respective end. At the first, or cutter end, a face is provided to which the cutter blade 92 can be attached as by means of screws 93. The space 104 between the ears 114 at the first end is provided so that the bead 94 which is removed by the blade can pass out through that opening and not interfere with the operation of the blade. At the first end of the arm 80 is a pin 90, transverse to the arm which carries rollers 91, which may for example be ball bearings, which can be slipped over the pin or shaft 90, and locked by any convenient means such as the rings 106.

At the opposite, or second end of the cutter arm, there is a hub 87 which is attached to the arm, such as by welds 40, so that the arm can be rotated by inserting a segment of the torque tube 36 into the hub and locking it by means of a pin or bolt 88 as previously described.

There is a support frame 82 which has two legs 108 and a third short arm which slips in between the ears 112 of the cutter arm, and is bolted to the cutter arm by means of bolt 85 and nut 86, or similar means.

The second end of the cutter arm has a circular portion 110 and an extension 84 such that when the cutter arm is in the counterclockwise position indicated by 80', it will be spaced away from the pipe by a distance 132. As the torque tube is turned in a clockwise direction by means of hub 47, the cutter arm 80 is rotated about the bolt 85 and because of the offset position on the support frame 82, the cutter blade 92 will then be in cutting position and the projection 84 rests against a pin 83 in the support frame. In that position the support legs 108 and the cutter blade form a three point suspension centering the torque tube and providing the proper angle of the blade to cut off the bead on the inner surface 24 of the pipe 18.

Detail as to how the cutter bar is rotated to draw the cutter blade away from the wall is shown in FIG. 13. The circle 120 represents the internal surface 24 of the pipe, the center being at 122. Legs 124, 126 represent radii of the circle 12, which could be support legs. The dashed outline 136 represents such a support member. The cutter bar 128 supports the cutter head 130 at its outer end, and is pivoted to the support member 136 at point 134, off center by spacing 132. When in the position shown in full line, the cutter head is pressed against the circle 120. When the arm 128 is rotated counterclockwise, to the position 128' shown in dashed line, the cutter head pulls away from the circle by the same distance 132 as the spacing 132 between pipe center 122 and pivot point 134.

The legs 108 of the support frame 82 have slots 96 through which a bolt 97 can be passed to lock to the legs of the support frame pairs of shoes 100 which are 90° angle members, for providing a broad lateral support to the support frame, and therefore to the blade 92. These shoes 100 have portions 98 which are bolted to corresponding sides of the legs 108 and are attached at a desired radius by means of bolts 97.

On the outer faces of the shoes 100 are pairs of guides 102 and 104, which are curved so as to provide a suitable support against the internal surface 24. The outer edges of the supports 102 are chamfered so that they can be adapted to slide over an internal bead so that the bead itself will be positioned within the space between the two inner guides 104 and take support upon the internal of the pipe on each side of the bead.

When a cut of the bead has been completed, the torque tube is then turned counterclockwise which will swing the cutter 80 to the position 80' shown in dashed outline, and the torque tube carrying the cutter head and the support members 14 and 16 can be withdrawn from the pipe. They can then be inserted into another pipe, and the cutter head moved along the pipe until the two projections 102 and 104 have slid over the internal bead then the torque tube is rotated clockwise and the cut is made.

Figure 8:
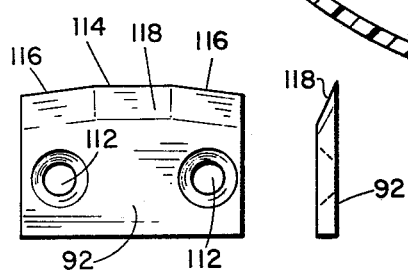
FIG. 8 shows the detail of the cutter blade.

FIG. 8 shows the general shape of the blade 92, which is made from selected tool steel of a selected thickness, and is attached to the cutter arm by means of screws inserted through the screw holes 112. The blade is brought to a cutting edge, which is in the form of three linear segments, a transverse segment 114 which cuts most deeply into the inner wall, and two sloping portions 116. The plane of the cutting edge 118 is at a selected small angle to the internal surface 24 of the pipe. The central portion of the blade projects a selected short distance below the surface 24, with the portion 16 tapering the depth of cut to zero. The rollers 91 not only straddle the bead to be removed but also serve to space the cutting edge 114 of the blade 92 at the desired radius with respect to the internal surface 24 of the pipe, so that the blade will cut off the bead without projecting into the surface 24 more than a selected small distance.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for removing the internal bead from a joint between two lengths of polyethylene pipe joined by the butt fusion method, comprising an assembly having in combination;
   (a) a torque tube of adjustable length, having at a distal end, adapted to be inserted into the open end of a polyethylene pipe, a cutter head means adapted to be positioned over said bead, and at the proximal end outside said pipe, a crank handle assembly means;
   (b) said cutter head means comprising an assembly, including support leg means to rest against the inner surface of said pipe in a straddling position over said bead, a cutter arm means rotatably supported to said leg means about an axis which is offset from and parallel to the axis of said pipe, the length of said cutter arm means being such that the free end of said cutter arm means is spaced from the said inside surface of said pipe in a first position and in contact with said inside surface in a second position, a cutter blade positioned at said free end at a selected angle the outermost end of said blade positioned substantially parallel to said torque tube and approximately at the inner surface of said pipe, and means co-axially with said offset axis to attach said distal end of said torque tube to said cutter arm; and
   (c) means to rotatably support said torque tube within said pipe.

2. The apparatus of claim 1 in which said means to rotatably support said torque tube comprises a plate attached in a perpendicular plane to said torque tube, said plate carrying a plurality of spaced radial arms and means to adjustably position said radial arms outwardly in said pipe.

3. The apparatus as in claim 2 including roller means at the ends of said radial arms.

4. The apparatus as in claim 1 in which said torque tube comprises a plurality of selected lengths of tube segments of the same diameter, and means to couple said tube segments coaxially end to end.

5. The apparatus as in claim 4 in which said means to couple said segments in coaxial end to end position comprises first collar means attached at one end of one segment into which a first end of a second segment can be inserted, and means to lock said first collar means to said second segment.

6. The apparatus as in claim 5 in which said means to lock comprises diametrical openings in said first collar means and said segment, and pin means adapted to be inserted into said openings.

7. The apparatus as in claim 4 including at least one support means attached to said torque tube between said proximal and distal ends.

8. The apparatus as in claim 7 in which said support means comprises transverse plate means carrying a plurality of adjustable radial arms, and means to position said plate means over said torque tube.

9. The apparatus as in claim 8 in which means to position said plate means comprises a collar having a central opening through said plate means, said collar adapted to receive the first end of one segment and a second end of a second segment.

* * * * *